(12) United States Patent
Nir-Buchbinder et al.

(10) Patent No.: US 8,479,166 B2
(45) Date of Patent: Jul. 2, 2013

(54) DETECTING LOCKING DISCIPLINE VIOLATIONS ON SHARED RESOURCES

(75) Inventors: Yarden Nir-Buchbinder, Haifa (IL); Orna Raz-Pelleg, Haifa (IL); Rachel Tzoref, Haifa (IL); Shmuel Ur, Shorashim (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 12/197,316

(22) Filed: Aug. 25, 2008

(65) Prior Publication Data

US 2010/0050161 A1 Feb. 25, 2010

(51) Int. Cl.
*G06F 9/45* (2006.01)
*G06F 9/52* (2006.01)

(52) U.S. Cl.
CPC ..................... *G06F 9/526* (2013.01)
USPC ........... 717/126; 717/133; 717/140; 717/150; 717/151

(58) Field of Classification Search
None
See application file for complete search history.

(56) References Cited

U.S. PATENT DOCUMENTS

| | | | | |
|---|---|---|---|---|
| 5,068,781 A * | 11/1991 | Gillett et al. | | 710/108 |
| 5,590,326 A * | 12/1996 | Manabe | | 711/150 |
| 5,822,588 A | 10/1998 | Sterling et al. | | |
| 5,860,126 A * | 1/1999 | Mittal | | 711/167 |
| 6,076,126 A * | 6/2000 | Shagam | | 710/108 |
| 6,343,338 B1 * | 1/2002 | Reneris | | 710/200 |
| 6,735,760 B1 * | 5/2004 | Dice | | 717/139 |
| 6,795,901 B1 * | 9/2004 | Florek et al. | | 711/152 |
| 7,457,826 B2 * | 11/2008 | Hudis et al. | | 1/1 |
| 7,493,618 B2 * | 2/2009 | Michael et al. | | 718/102 |
| 7,644,409 B2 * | 1/2010 | Dice et al. | | 718/104 |
| 7,984,248 B2 * | 7/2011 | Kottapalli et al. | | 711/152 |
| 2002/0004810 A1 * | 1/2002 | Reneris | | 709/104 |
| 2002/0165929 A1 * | 11/2002 | McLaughlin et al. | | 709/213 |
| 2003/0126200 A1 * | 7/2003 | Wolff | | 709/203 |
| 2006/0136418 A1 * | 6/2006 | Hudis et al. | | 707/9 |
| 2006/0161738 A1 * | 7/2006 | Saha et al. | | 711/150 |
| 2007/0192550 A1 * | 8/2007 | Rodeheffer et al. | | 711/154 |
| 2007/0198781 A1 * | 8/2007 | Dice et al. | | 711/145 |
| 2007/0198978 A1 * | 8/2007 | Dice et al. | | 718/100 |
| 2007/0239915 A1 * | 10/2007 | Saha et al. | | 710/200 |
| 2007/0282838 A1 * | 12/2007 | Shavit et al. | | 707/8 |
| 2008/0005742 A1 | 1/2008 | Ma | | |
| 2008/0115042 A1 * | 5/2008 | Akkary et al. | | 714/806 |
| 2009/0144519 A1 * | 6/2009 | Codrescu et al. | | 711/207 |
| 2010/0023706 A1 * | 1/2010 | Christie et al. | | 711/150 |
| 2010/0100690 A1 * | 4/2010 | Rajamani et al. | | 711/152 |
| 2011/0161603 A1 * | 6/2011 | Taillefer | | 711/150 |

* cited by examiner

*Primary Examiner* — Isaac Tecklu

(57) ABSTRACT

Detecting locking discipline violations on shared resources. For example, a method of detecting locking discipline violations of shared resources of a computing platform, by a testing process to be executed concurrently with one or more other processes on said computing platform, the testing process comprising: locking a shared resource of said computing platform; reading a value of the shared resource; locally storing the value of the shared resource; rereading the value of the shared resource after a predefined time period; and generating a locking discipline violation report if the value of said shared resource as reread by said rereading is different from the value of said resource as locally stored by said locally storing.

17 Claims, 2 Drawing Sheets

DETECTING LOCKING DISCIPLINE VIOLATIONS ON SHARED RESOURCES

FIELD

Some embodiments are related to the field of computer programming, and more particularly to debugging and testing computer programs.

BACKGROUND

A computing system may include multiple processes or threads, which may utilize one or more shared resources. If a first process and a second process attempt to concurrently access a shared resource, data corruption or other errors may occur, or unexpected system behavior may occur. In order to prevent or mitigate such errors, a locking discipline may be defined and used by the computing system. For example, the first process may lock the resource, access the resource, and then unlock the resource. While the resource is locked, the second resource may not access the locked resource.

Locking disciplines may be defined and/or enforced, for example, by an Operating System (OS) of the computing system. Unfortunately, a locking discipline may be violated by one or more processes, for example, due to an "illegal" function call, thereby resulting in data corruption and other errors.

In some computing systems, dynamic monitoring of the accesses by a program to shared variables, as well as dynamic monitoring of lock acquisitions, may be used in order to partially detect violation of a locking discipline. Unfortunately, in some computing environments, it may be difficult to detect some or all of the accesses by a program to shared variables, or to detect some or all of the lock acquisitions. Additionally, this method may result in performance overhead, which may be difficult to dynamically control, for example, particularly if the monitoring is performed using instrumentation.

In other computing systems, a static analysis may be used in order to partially detect some possible violations of a locking discipline. Unfortunately, it may be difficult to determine statically, by observing a source code, which locks are held by a process or by a thread while accessing a shared resource. Accordingly, static analysis methods may be inaccurate, and may produce erroneous results, e.g., false detection of locking violations.

In still other computing systems, detection of locking discipline violations may be partially achieved by inserting "noise" into the computer program, for example, statements that affect the scheduling of the computer program, e.g., calls to sleep( ) and yield( ). The inserted noise may result in interleavings that are not typically exercised in the testing environment, thereby increasing the probability to exhibit concurrency bugs, including locking discipline violations. Unfortunately, this method may be difficult to implement in computing environments in which static or run-time monitoring of accesses to shared resources and locks is difficult. Additionally, if the computing system is required to fulfill timing constraints, or relies on particular hardware assumptions, then the inserted noise may be "illegal", namely, may change the semantics of the program or may violate preconditions of the environment in which the program is required to run, thereby producing false detection of locking violations.

SUMMARY

Some embodiments include, for example, devices, systems, and methods of detecting locking discipline violations on shared resources.

Some embodiments include, for example, a method of detecting locking discipline violations of shared resources of a computing platform, by a testing process to be executed concurrently with one or more other processes on said computing platform, the testing process including: locking a shared resource of said computing platform; reading a value of the shared resource; locally storing the value of the shared resource; rereading the value of the shared resource after a predefined time period; and generating a locking discipline violation report if the value of said shared resource as reread by said rereading is different from the value of said resource as locally stored by said locally storing.

Some embodiments include, for example, a system for detecting locking discipline violations of shared resources of a computing platform, the system including: a testing process to be executed concurrently with one or more other processes on said computing platform, wherein the testing process is to lock a shared resource of said computing platform, to read a value of the shared resource, to locally store the value of the shared resource, to reread the value of the shared resource after a predefined time period, and to generate a locking discipline violation report if the value of said shared resource as reread is different from the value of said resource as locally stored.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
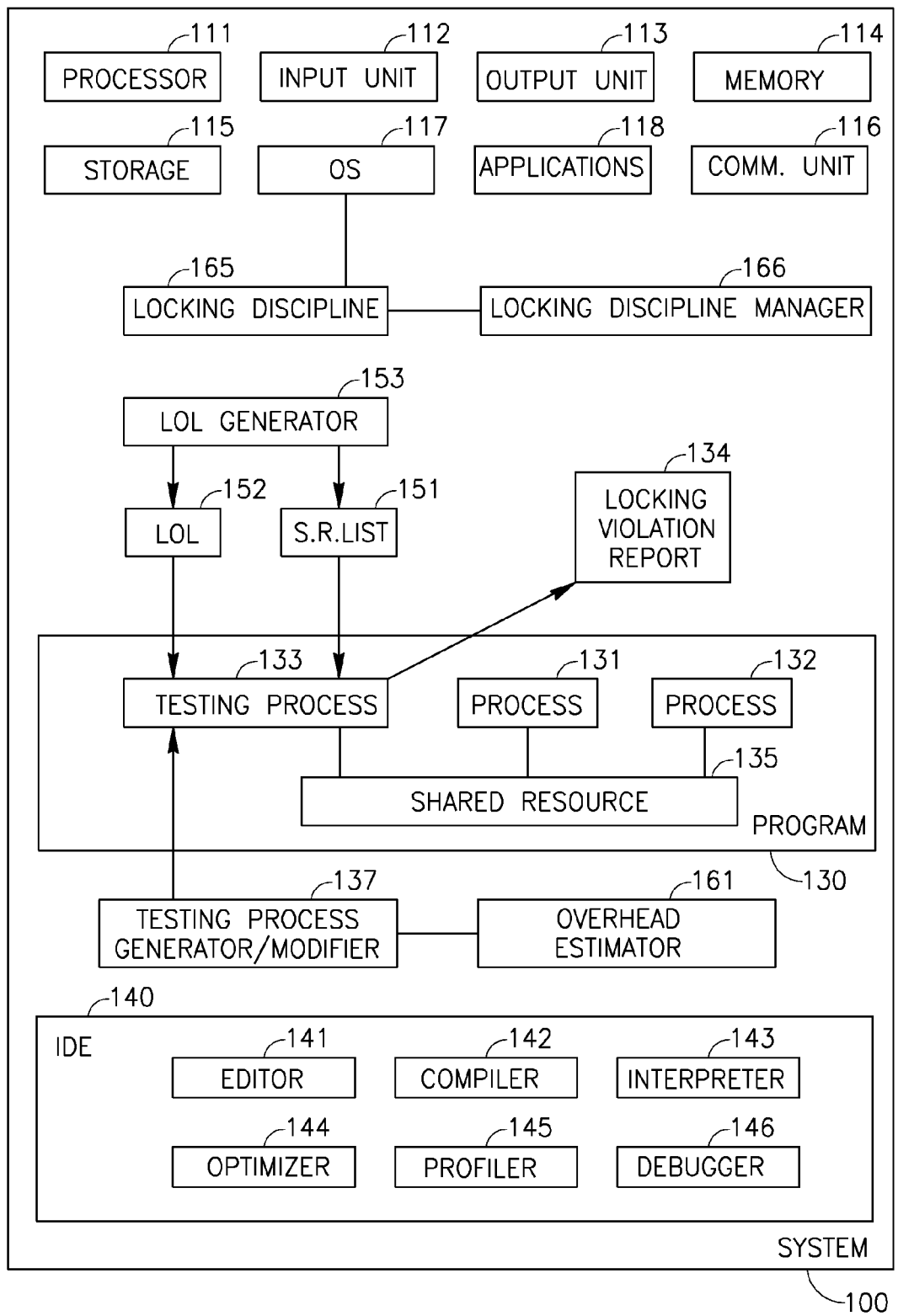
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The terms "program", "computer program" or "code" as used herein include, for example, a source code, a computer program, a code or program written in a high-level programming language, a code or program written in a very high-level programming language, a code or program written in a low-level programming language, an assembly code or program, a machine language code or program, a single-thread program, a multiple-thread program, a portion of a code or program, a segment of a code or program, one or more instructions or sets of instructions, one or more subroutines, one or more procedures, one or more functions, one or more libraries, a logic, an object-oriented code or program, a portable or non-portable code or program, a code or program that requires compilation by a compiler, an originally-written code or program, a non-optimized code or program, an optimized code or program, a non-modified program, a modified program, a debugged program, a non-debugged program, a pre-compilation program version, a post-compilation program version, a pre-optimization program version, a post-optimization program version, a pre-linking program version, a post-linking program version, a program that was modified manually by a programmer, a program that was modified automatically by a compiler and/or linker and/or debugger and/or optimizer, a program that was subject to one or more iterations of optimization, a program that was subject to one or more methods of optimization, or the like.

The term "process" as used herein includes, for example, a portion or an instance of a computer program that is being executed by a computing system, e.g., by a computing system able to concurrently execute multiple processes.

The term "thread" as used herein includes, for example, a sub-process or a portion of a process that is being executed by a computing system, e.g., by a multi-threading computing system able to concurrently execute multiple threads.

Although portions of the discussion herein may relate, for demonstrative purposes, to a first process and a second process that attempt to access a shared resource, some embodiments may be used in conjunction with other combinations of processes and/or threads, for example: more than two processes; a first process of a first program, and a second process of the first program; a first process of a first program, and a second process of a second program; two or more threads; one or more threads, and one or more processes; threads of different processes; threads of different programs; processes of different programs; or other suitable combinations.

The term "resource" as used herein includes, for example, a physical and/or virtual component of a computing system; a variable; a database; a table; a record; a data item; a list; a field; an object; a memory cell; a memory area; a memory block; a disk or a portion thereof; a storage unit or a portion thereof; a file; a folder; a directory; a network connection; or the like.

The terms "shared resource" or "common resource" as used herein include, for example, a resource which may be accessed by two or more processes, threads, programs, routines, subroutines, functions, or other suitable software components and/or hardware components.

The terms "lock discipline" or "locking discipline" as used herein include, for example, a scheme or algorithm that manages or controls the access of processes, threads and/or programs to a shared resource, or that sets rules for concurrent and/or sequential access of processes, threads and/or programs to a shared resource; a set of rules of locking and/or unlocking a resource; a set access control rules or authorization rules with regards to a shared resource; a locking scheme implemented as part of an Operating System (OS), as part of an OS kernel, as part of an OS shell, as a dedicated or integrated software component and/or hardware component, or the like.

The terms "violation" or "breach" as used herein with regard to a locking discipline include, for example, an unpermitted or "illegal" access (e.g., read access or write access) to a shared resource, for example, by a first process while the shared resource is locked by a second process.

The terms "testing process" or "mock process" as used herein include, for example, a process or thread that is not required for operation of the program and is added in order to detect locking discipline violations during runtime of the program, e.g., during concurrent execution with one or more other processes or threads; an addendum or supplemental process or thread; a process or thread intended to probe, test and/or monitor operations such as, for example, access to shared resources, taking of lock(s), and/or removal or release of lock(s); a locking discipline violation detection process or thread; or the like.

As an overview, some embodiments include devices, systems, and methods of detecting locking discipline violations on shared resources. For example, one or more "mock" or testing processes (or testing threads) are manually or automatically created and added to a computing system, e.g., during a testing phase of a computer program, in order to detect locking discipline violations on shared resources. The testing process or testing thread takes a lock on a shared resource; reads the shared resource associated with the lock; waits a period of time; and then reads the shared resource again. The testing process checks whether or not the value of the shared resource changed while the lock is held on the shared resource. If the value of the shared resource changed while the lock is held on the shared resource, then the testing process determines that a locking discipline violation occurred, and generates an alert or an error report to indicate the detected locking discipline violation. In contrast, if the value of the shared resource did not change while the lock is held on the shared resource, then the testing process releases the lock.

Some embodiments thus allow detection of locking discipline violations by using testing process or testing threads. Some embodiments may not require dynamic monitoring of accesses to shared variables and locks, and may thus be relatively easy to implement and may be suitable for computing environments in which dynamic monitoring is difficult or not possible. In some embodiments, performance overhead due to the testing processes or testing threads may be adjusted or controlled. This may be performed, for example, by controlling or modifying the number of testing processes or testing threads; or by controlling or modifying the number of accesses to shared resources by the testing processes or testing threads; or by controlling or modifying the wait time that a testing process or testing thread waits between two consecutive readings of a shared resource. In some embodiments, the detection of locking discipline violations may be accurate, and may produce substantially no erroneous results, e.g., substantially no false detections of locking violations.

In some embodiments, a "white box" method is used to determine whether violation of locking discipline on shared resources exists in concurrent systems. For example, if it is defined (e.g., by a locking discipline of an OS) which lock is to be taken prior to accessing a particular shared resource, some embodiments detect accesses to the shared resource in which the lock was not taken. Some embodiments may thus assist to eliminate "race" conditions, for example, unsynchronized accesses to a shared resource, which may result in unexpected behavior of the system, e.g., depending on the timing of the accesses to the shared resource.

FIG. 1 schematically illustrates a block diagram of a system 100 in accordance with some demonstrative embodiments of the invention. System 100 may be or may include, for example, a computing environment, a computing device, a computer, a Personal Computer (PC), a server computer, a client/server system, a mobile computer, a portable computer, a laptop computer, a notebook computer, a tablet computer, a network of multiple inter-connected computers or servers or devices, or the like.

System 100 includes, for example, a processor 111, an input unit 112, an output unit 113, a memory unit 114, a storage unit 115, and a communication unit 116. System 100 may optionally include other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) 117 of system 100 and of one or more software applications 118.

Input unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units.

Storage unit 115 includes, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115, for example, store data processed by system 100.

Communication unit 116 includes, for example, a wired or wireless Network Interface Card (NIC), a wired or wireless modem, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, communication unit 116 includes, or is associated with, one or more antennas, for example, a dipole antenna, a monopole antenna, an omni-directional antenna, an end fed antenna, a circularly polarized antenna, a micro-strip antenna, a diversity antenna, or the like.

In some embodiments, some or all of the components of system 100 may be enclosed in a common housing or packaging, and may be interconnected or coupled or operably associated using one or more wired or wireless links. In other embodiments, components of system 100 may be distributed among multiple or separate devices or locations, may be implemented using a client/server configuration, may communicate using remote access methods, or the like.

System 100 may include one or more programs, having one or more processes and/or threads. For demonstrative purposes, system 100 includes a program 130 which may be composed and edited using a software development tool, for example, an Integrated Development Environment (IDE) 140. The IDE 140 includes one or more tools, for example, a source code editor 141, a compiler 142 and/or an interpreter 143, an optimizer 144, a profiler 145, and a debugger 146. The IDE 140 may include other and/or additional components, for example, automation tools, a version control system, tools to facilitate the construction of a Graphic User Interface (GUI), visual programming tools, or the like.

For demonstrative purposes, program 130 includes two processes 131-132. In other embodiments, processes 131-132 may be processes of different programs. Some embodiments may be used in conjunction with multiple threads, instead of or in addition to multiple processes.

System 100 may utilize a locking discipline 165, for example, defined and/or managed by a locking discipline manager 166. The locking discipline manager 166 may be, for example, part of the OS 117, part of a kernel of a shell of OS 117, or a dedicated or integrated software component and/or hardware component.

A resource 135 may be a shared resource, for example, a variable or object which may be accessed by process 131 and process 132. In accordance with some embodiments, a testing process 133 is created and added to program 130, for example, manually or automatically (e.g., by a testing process generator/modifier 137, which may be part of the IDE 140 or a separate component of system 100). During runtime of program 130, the testing process 133 takes a lock on the shared resource 135; the testing process 133 reads the shared resource 135 associated with the lock; the testing process 133 wait a period of time; and then, the testing process 133 reads again the shared resource 135. The testing process 133 checks whether or not the value of the shared resource 135 changed while the lock is held on the shared resource 135. If the value of the shared resource 135 changed while the lock is held on the shared resource 135, then the testing process 133 determines that a locking discipline violation occurred, and generates an alert or an error report to indicate the detected locking discipline violation; for example, a locking violation report 134 is produced as output, or updated. In contrast, if the value of the shared resource 135 did not change while the lock is held on the shared resource 135, then the testing process 133 releases the lock.

In some embodiments, the testing process 133 receives as input, for example, a list of shared resources 151 (e.g., list of variable names), and list of corresponding lock names 152 (e.g., names of lock or locks associated with each shared resource).

In some embodiments, for example, one or more new testing processes are created and added to the program 130, at one or more suitable program locations. The program locations may be manually predefined by a programmer, and/or may be dynamically determined, e.g., based on a value of a program counter. The one or more new testing processes are started, for example, prior to or concurrently with running the program 130, or prior to or concurrently with running one or more processes of program 130.

Each testing process, for example, testing process 133, receives as input the list of shared resources 151, and determines which shared resource(s) to access. For each such shared resource, the testing process 133 takes the associated lock(s); reads the shared resource; goes to sleep for a period of time (e.g., one millisecond, six milliseconds, or the like); then returns and checks whether or not the value of the shared resource changed. A change in the value of the shared resource indicates that a locking violation occurred with respect to that shared resource, and the locking violation report 134 is produced or updated accordingly.

In some embodiments, performance overhead may be tuned and/or controlled, manually and/or automatically. For example, some embodiments may utilize manual and/or automatic modification of the number of testing processes that are created, e.g., in order to accommodate particular performance overhead requirements. Some embodiments may utilize manual and/or automatic modification of the number of accesses of a testing process to shared resource(s), e.g., in order to accommodate particular performance overhead requirements; optionally, the number of accesses may be an additional input received by the testing process. Some embodiments may utilize manual and/or automatic modification of the wait time that the testing process waits between consecutive accesses to the shared resources. e.g., in order to accommodate particular performance overhead requirements. Other suitable modifications may be used in order to accommodate performance overhead requirements.

In some embodiments, the performance overhead may be manually controlled or modified or adjusted, for example, by manual modification of parameters. In other embodiments, the performance overhead may be automatically controlled or modified or adjusted, for example, by automatic modification of parameters. For example, an overhead estimator 161 may estimate, measure, or calculate the overhead incurred (e.g., processing resources utilization, memory resources utilization, or the like) due to the execution of the testing process 133. If the overhead is greater than a pre-defined threshold, the testing process generator/modifier 137 may modify one or more parameters used by the testing process 133. For example, in order to decrease performance overhead due to the execution of the testing process 133, the testing process generator/modifier 137 may gradually modify the time period that the testing process 133 waits between the initial reading of the value of the shared resource 135 and the subsequent reading of the value of the shared resource 135. Similarly, in order to decrease performance overhead due to the execution of the testing process 133, the testing process generator/modifier 137 may gradually decrease the number of accesses of the testing process 133 to the shared resource 135. Other suitable modifications may be used.

In some embodiments, shared resources may be automatically identified by system 100, or may be semi-automatically identified (e.g., by manual review of an automatically-generated list of candidate shared resources). For example, instead of, or in addition to, asking the programmer to identify the shared resources, system 100 may utilize dynamic analysis and/or static analysis in order to identify candidate shared resources. Then, the list of candidate shared resources may be validated using some embodiments. In some embodiments, an "Eraser" analysis algorithm may be used in order to automatically determine which locks protect which variables; for example, the "Eraser" algorithm described in the article by Savage et al., "Eraser: A Dynamic Data Race Detector for Multithreaded Programs" (ACM Transactions on Computer Systems, Vol. 15, No. 4, November 1997, pages 391-411); or the "Eraser" algorithm described in the presentation by Shin, "Eraser: A Dynamic Data Race Detector for Multithreaded Programs", dated Mar. 5, 2008, available online at <http://pswlab.kaist.ac.kr/lab-orientation/eraser.ppt>. In some embodiments, other suitable algorithms may be used, for example, algorithms that infer similar information, optionally eliminating the need for user annotations.

In some embodiments, for example, a lock detector 155 may be used by system 100, in order to automatically determine which lock(s) protect which shared resource(s), thereby allowing automatic creation and addition of testing processes to monitor possible changes in values of shared variables that are temporarily locked. In some embodiments, the lock detector 155 may automatically generate a list indicating locks and their respective protected variables (or shared resources); for example, as a combined list, or as multiple lists or tables, e.g., the list of shared resources 151 and the list of corresponding lock names 152. In some embodiments, the lock detector 155 may automatically generate a combined list, indicating that lock "A" protects the variables "x", "y" and "z"; that lock "B" protects the variable "k"; or the like. In some embodiments, the list may be generated manually by a programmer, in addition to or instead of the automatic generation of the list by the lock detector 155. In some embodiments, the list may be automatically generated by the lock detector 155, and may then be manually reviewed and corrected by a programmer, e.g., prior to utilization of the list in order to create testing processes.

In some embodiments, once the list of locks and corresponding shared resources is available, one or more testing processes are created. Each testing process may, for example, loop indefinitely, or may loop for a significant pre-defined number of iterations, and do the following operations: wait (e.g., sleep) for a period of time; select a lock from the list of locks (e.g., select a lock among lock "A", lock "B", and other locks in the list); lock the selected lock; read, and store locally, the value(s) of the variable(s) that are protected by the selected lock; wait (e.g., sleep) for a period of time; read the value(s) of the variable(s) that are protected by the selected lock; compare the newly-read value(s) to the previously-stored value(s) of the protected variable(s); if the newly-read value of a protected variable is different from the previously-read value of the protected variable, then produce an error message (for example, generate or update the locking violation report 134, to indicate the name of the lock and the name of the protected variable or shared resource); and release the lock.

In some embodiments, the list of locks and corresponding shared resources may be generated automatically, e.g., dynamically during program execution. For example, a list of locks is created, starting with an empty list. When a lock is being locked during runtime, add the name of the lock to the list of locks (if the lock is not already included in the list); and also add the name of the lock to a sub-list of lock currently held. When a variable is "touched" or accessed, add the name of the variable to be associated with all the locks that are currently held (optionally, with no locks). When a lock is released, remove the name of the lock from the list of locks that are currently being held.

In some embodiments, the automatically generated list of locks (and corresponding shared resources protected by the locks) may be utilized by testing processes, without prior manual review by a programmer. In other embodiments, the automatically generated list of locks (and corresponding shared resources protected by the locks) may be manually reviewed, edited, modified, pruned, or corrected by a programmer, e.g., prior to utilizing the list by testing processes.

In some embodiments, one or more static analysis tools may be used, for example, to perform the following operations: identify substantially all the locks; identify the scope of each lock; identify the variable(s) within the scope of each lock; generate a list of all the locks, each lock associated with the variables within its scope.

In some embodiments, dynamic generation and/or static generation of the list of locks may be used, for example, in order to save to the programmer time and/or efforts. In some embodiments, the generated list of locks may be utilized for other purposes, and/or may be utilized as part of the documentation of program 130.

Figure 2:
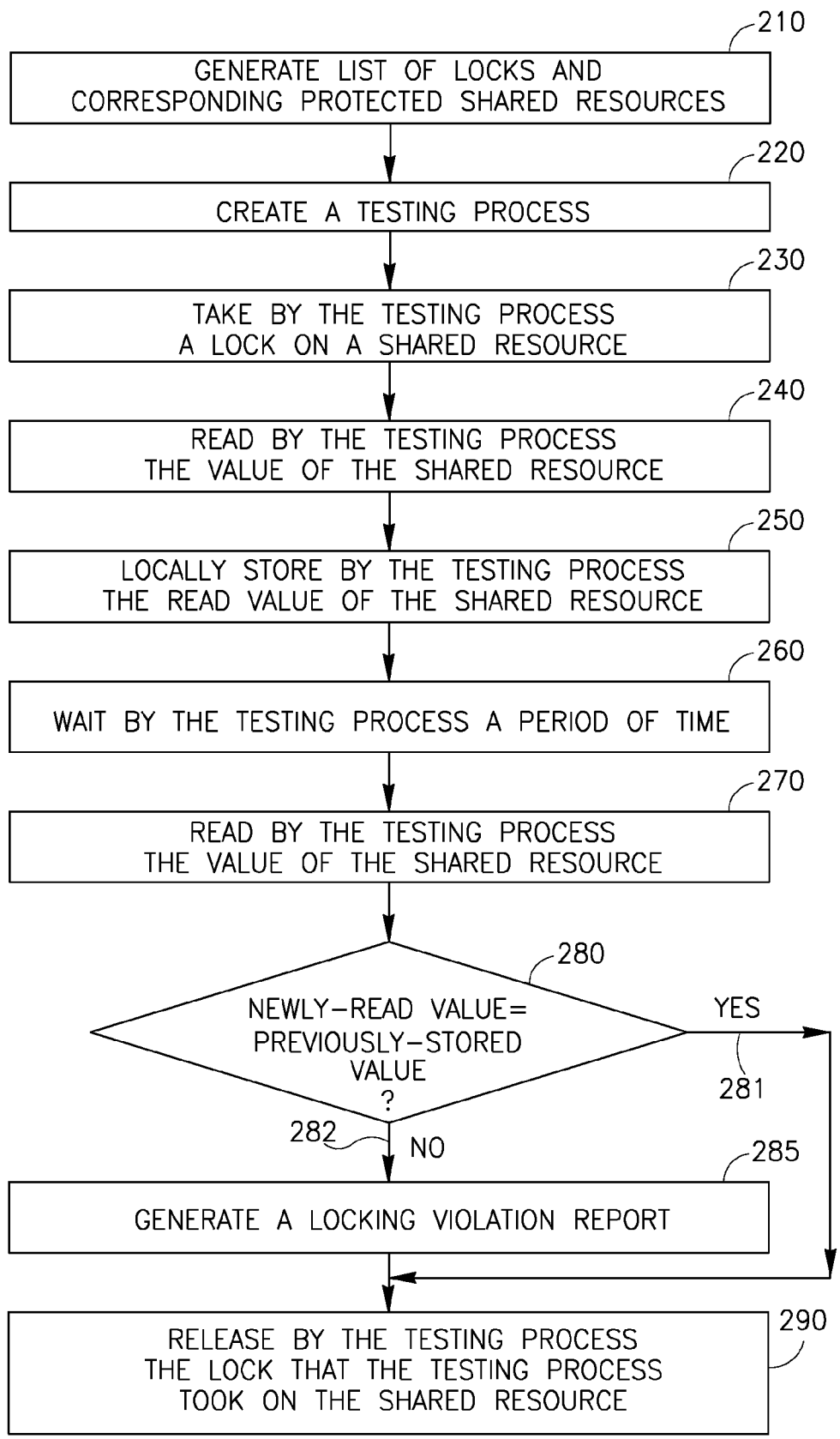
FIG. 2 is a schematic flow-chart of a method of detecting locking discipline violations, in accordance with some demonstrative embodiments of the invention.

FIG. 2 is schematic flow-chart of a method of detecting locking discipline violations, in accordance with some demonstrative embodiments invention. Operations of the method may be used, for example, by system 100 of FIG. 1, and/or by other suitable units, devices and/or systems.

In some embodiments, the method may include, for example, generating a list of locks and the corresponding shared resources that each lock protects (block 210). This may be performed, for example, manually and/or automatically.

In some embodiments, the method may include, for example, creating a testing process (or testing thread), which is added to one or more other processes or threads of a program (block 220).

In some embodiments, the method may include, for example, taking by the testing process a lock on a shared resource (block 230).

In some embodiments, the method may include, for example, reading by the testing process the value of the shared resource (block 240).

In some embodiments, the method may include, for example, locally storing by the testing process the read value of the shared resource (block 250).

In some embodiments, the method may include, for example, waiting by the testing process a period of time (block 260). In some embodiments, the waiting period may be pre-defined; may be random or pseudo-random; may be selected randomly or pseudo-randomly from a range of values or from a group of values; may be configured and/or modified based on one or more properties of the program and/or the computing system; or the like.

In some embodiments, the method may include, for example, reading by the testing process the value of the shared resource (block 270).

In some embodiments, the method may include, for example, checking whether the newly-read value of the shared resource is identical to the previously-stored value of the shared resource (block 280).

If the newly-read value of the shared resource is not identical to the previously-stored value of the shared resource (arrow 281), then the method may include, for example, generating by the testing process a locking violation report (block 285); and proceeding with the operations of block 290 and onward.

In contrast, if the newly-read value of the shared resource is identical to the previously-stored value of the shared resource (arrow 282), then the method may include, for example, proceeding with the operations of block 290 and onward.

In some embodiments, the method may include, for example, releasing by the testing process the lock that the testing process took on the shared resource (block 290).

In some embodiments, one or more of the above operations may be performed during runtime of one or more programs, processes and/or threads which may access or may attempt to access the shared resource, e.g., concurrently with the execution of the testing process.

Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Some embodiments may utilize client/server architecture, publisher/subscriber architecture, fully centralized architecture, partially centralized architecture, fully distributed architecture, partially distributed architecture, scalable Peer to Peer (P2P) architecture, or other suitable architectures or combinations thereof.

Some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. A method of detecting locking discipline violations of shared resources of a computing platform, by a testing process to be executed concurrently with one or more other processes on said computing platform, the testing process comprising:
    locking a shared resource of said computing platform;
    reading a value of the shared resource;
    locally storing the value read from the shared resource to a location other than the shared resource;
    rereading the value of the shared resource which has been locked, after a predefined time period;
    generating a locking discipline violation report if the value of said shared resource as reread by said rereading is different from the value of said resource as locally stored by said locally storing generating said list of locks prior to execution of a program which includes said testing process and said one or more other processes;
    wherein generating said list of locks comprises: performing a static analysis of a source code of said program, to detect one or more locks and one or more, respective, shared resources protected by the one or more locks;
    identifying substantially all the locks in said program;
    identify a scope of each lock of said locks;
    identifying one or more variables that are within the scope of each lock; and
    generating said list of locks, wherein each lock is associated with the one or more variables within its scope.

2. The method of claim 1, wherein the testing process comprises:
    selecting said lock from a list of locks corresponding to a list of shared resources, wherein each lock of said list protects one or more of the shared resources of said computing platform.

3. The method of claim 2, comprising:
    automatically generating said list of locks during execution of a program on said computing platform, wherein the program includes said testing process and said one or more other processes.

4. The method of claim 3, comprising, during execution of said program:
    detecting that a lock is taken;
    adding a name of the taken lock to the list of locks;
    adding the name of the taken lock to a sub-list of held locks;
    detecting access to a shared resource; and
    associating the name of the accessed shared resource with all the locks of the sub-list of held locks.

5. The method of claim 4, comprising:
    subsequent to generation of said list of locks, and prior to selecting said lock from said list of locks, presenting said list of locks to a programmer of said program for review, and modifying said list of locks based on input received from said programmer.

6. The method of claim 1, comprising:
    if a performance overhead associated with execution of the testing process is greater than a threshold value, automatically modifying said pre-defined time period.

7. The method of claim 1, wherein the predefined time period comprises a time period selected from the group consisting of:
    a pseudo-random time period;
    a time period calculated by taking into account one or more properties of said computing platform; and
    a time period calculated by taking into account one or more properties of a program running on said computing platform.

8. A computerized system for detecting locking discipline violations of shared resources of a computing platform, the system comprising:
    a processor;
    a testing process adapted, to be executed concurrently with one or more other processes executed by said processor, wherein the testing process is configured:
    to lock a shared resource of said computing platform;
    to read a value of the shared resource;
    to locally store the value read from the shared resource to a location other than the shared resource;
    to reread the value of the shared resource that has been locked after a predefined time period,
    to generate a locking discipline violation report if the value of said shared resource as reread is different from the value of said resource as locally stored generating said list of locks prior to execution of a program which includes said testing process and said one or more other processes;

wherein generating said list of locks comprises: performing a static analysis of a source code of said program, to detect one or more locks and one or more, respective, shared resources protected by the one or more locks;

identifying substantially all the locks in said program;

identify a scope of each lock of said locks;

identifying one or more variables that are within the scope of each lock; and generating said list of locks, wherein each lock is associated with the one or more variables within its scope.

9. The system of claim 8, wherein the testing process is to select said lock from a list of locks corresponding to a list of shared resources, wherein each lock of said list protects one or more of the shared resources of said computing platform.

10. The system of claim 9, comprising:
a list generator to automatically generate said list of locks during execution of a program on said computing platform, wherein the program includes said testing process and said one or more other processes.

11. The system of claim 10, wherein during execution of said program the list generator is to detect that a lock is taken, add a name of the taken lock to the list of locks, add the name of the taken lock to a sub-list of held locks, detect access to a shared resource, and associate the name of the accessed shared resource with all the locks of the sub-list of held locks.

12. The system of claim 11, wherein subsequent to generation of said list of locks, and prior to selection of said lock from said list of locks, the list generator is to present said list of locks to a programmer of said program for review, and to modify said list of locks based on input received from said programmer.

13. The system of claim 8, wherein the list of locks is generated prior to execution of a program which includes said testing process and said one or more other processes.

14. The system of claim 8, comprising:
a testing process modifier to automatically modify said pre-defined time period if a performance overhead associated with execution of the testing process is greater than a threshold value.

15. The system of claim 8, wherein the predefined time period comprises a time period selected from the group consisting of:

a pseudo-random time period;

a time period calculated by taking into account one or more properties of said computing platform; and a time period calculated by taking into account one or more properties of a program running on said computing platform.

16. A computer program product comprising:
a non-transitory computer useable medium
a first program instruction for locking a shared resource of said computing platform;
a second program instruction for reading a value of the shared resource;
a third program instruction for locally storing the value read from the shared resource to a location other than the shared resource;
a fourth program instruction for rereading the value of the shared resource that has been locked after a predefined time period;
a fifth program instruction for generating a locking discipline violation report if the value of said shared resource as reread by said rereading is different from the value of said resource as locally stored by said locally storing,
wherein said first, second, third, fourth and fifth program instructions are stored on said non-transitory computer readable media a sixth program instruction for generating said list of locks prior to execution of a program which includes said testing process and said one or more other processes;

wherein generating said list of locks comprises: performing a static analysis of a source code of said program, to detect one or more locks and one or more, respective, shared resources protected by the one or more locks;

identifying substantially all the locks in said program;

identify a scope of each lock of said locks;

identifying one or more variables that are within the scope of each lock; and generating said list of locks, wherein each lock is associated with the one or more variables within its scope.

17. The computer program product of claim 16, wherein the testing process comprises:
selecting said lock from a list of locks corresponding to a list of shared resources, wherein each lock of said list protects one or more of the shared resources of said computing platform.

* * * * *